(12) United States Patent
Yamaura et al.

(10) Patent No.: US 6,287,124 B1
(45) Date of Patent: Sep. 11, 2001

(54) MUSICAL PERFORMANCE PRACTICING DEVICE AND METHOD

(75) Inventors: Atsushi Yamaura, Austin, TX (US); Mikio Yamagishi, Tokyo (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/204,375

(22) Filed: Dec. 2, 1998

(30) Foreign Application Priority Data

Dec. 2, 1997 (JP) ................................................. 9-347235

(51) Int. Cl.[7] .......................... G09B 19/00; G09B 13/00; G09B 5/00; G09B 15/00
(52) U.S. Cl. .......................... 434/219; 434/118; 434/156; 434/227; 434/307 R; 434/308; 84/470 R
(58) Field of Search ..................................... 434/156, 219, 434/227, 228, 230, 231, 232, 233, 307 R, 118, 308, 309; 84/470 R, 477 R, 478, 483.1, 484, 485 R, 483.2

(56) References Cited

U.S. PATENT DOCUMENTS

| | | | |
|---|---|---|---|
| 5,140,886 | 8/1992 | Masaki et al. | 84/607 |
| 5,533,903 | * 7/1996 | Kennedy | 434/307 R |
| 5,585,583 | * 12/1996 | Owen | 84/470 R |

FOREIGN PATENT DOCUMENTS 8-314456   11/1996   (JP) .

OTHER PUBLICATIONS

John Thompson, The Adult Preparatory Piano Book (Book One), The Willis Music Company, pp. 50–53, Dec. 1943.*

* cited by examiner

Primary Examiner—John Edmund Rovnak
(74) Attorney, Agent, or Firm—Rossi & Associates

(57) ABSTRACT

Target music piece, which a trainee player aims to perform well through practice, is designated by a user or player from among various music genres such as classical music, popular music and enka (Japanese popular ballads). Lesson information supplying section supplies lesson information prepared by combining information descriptive of a plurality of training music pieces bearing particular relations to the target music piece, to allow the player to become skillful enough for performing the designated target music piece. The lesson information comprises a combination of information descriptive of a plurality of optimum training music pieces selected on the basis of all kinds of musical information, such as a music genre, key, rhythm and beat, of the target music piece. Control section controls player's performance practice on the basis of the lesson information supplied by the lesson information supplying section. This arrangement enables the player to acquire a skill necessary for performing the target music piece in a short time and with a small amount of training.

17 Claims, 12 Drawing Sheets

COMPOSITION INFO. 5
COMPOSITION INFO. 6
COMPOSITION INFO. 7
COMPOSITION INFO. 8

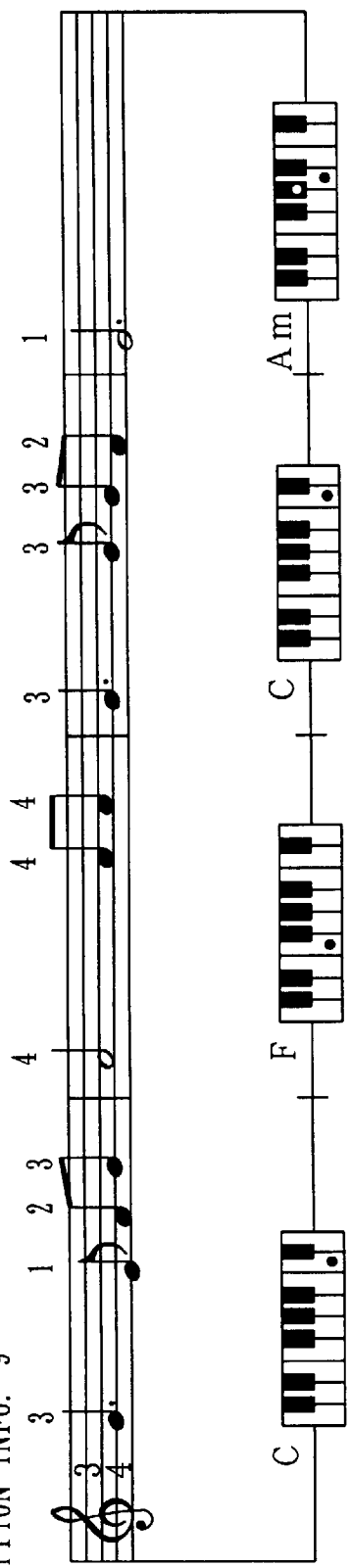
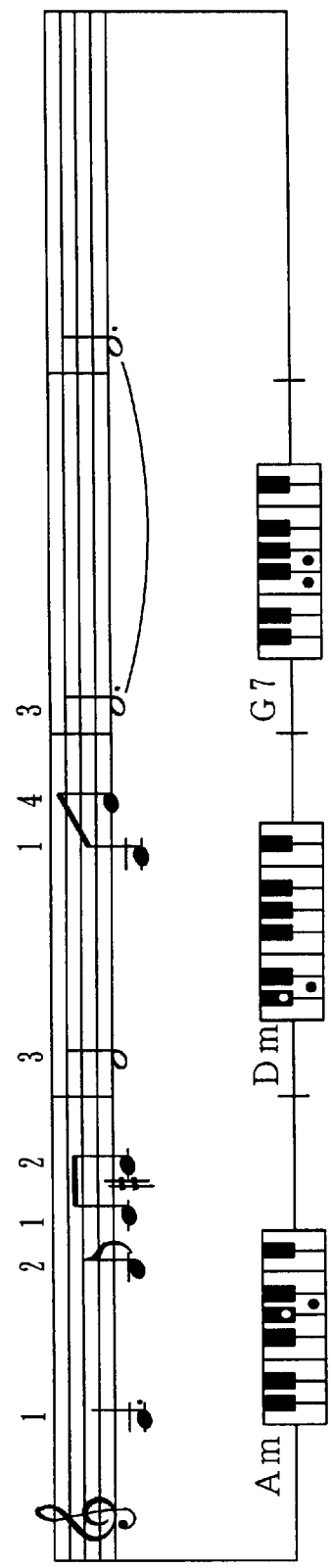

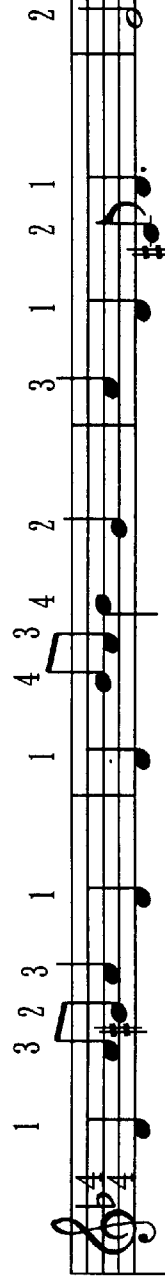
FIG. 6A
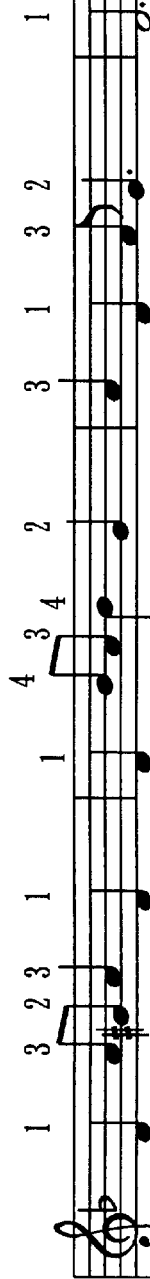
FIG. 6B

MUSICAL PERFORMANCE PRACTICING DEVICE AND METHOD

BACKGROUND OF THE INVENTION

The present invention relates generally to musical performance practicing devices and methods for assisting in manual performance practice on musical instruments, and more particularly to an improved musical performance practicing device and method which provide a variety of training menus to allow a trainee player to acquire a skill necessary for performance of a particular music piece or composition.

For people which want to practice performing on a musical instrument, particularly on the piano, it has been conventional to go to school where they are trained in a fundamental performance technique step by step in accordance with some instruction book ("Beyer" in the case of the piano). However, as generally appreciated today, it would take an enormous amount of time to acquire a sufficient ability or skill in playing the piano and thus practice on the piano has to be started in childhood and done continually; in this sense, the above-mentioned approach can not be suitably applied to those who start practicing on the piano only after having grown up to adulthood.

In recent years, musical instruments equipped with an automatic performance function have been used for practice on the natural piano and the like. In this case, each of such musical instruments automatically performs a designated target music piece, i.e., a composition which a trainee player aims to perform, so that the player can practice performing the entire music piece or repetitively performing only a selected partial phrase of the music piece with the instrument's automatic performance as a performance assistance or guide.

The above-mentioned conventional approach of mastering a performance skill step by step starting with the fundamental performance technique is not suitable for adults, because adults tend to feel it troublesome to go to school and it is often difficult for them to spare a practice time due to their busy schedule or the like. Although many adults may consider it unnecessary to do the fundamental practice at their age, not a few of them wish to become skillful or proficient enough to perform one to several music pieces, and these enthusiastic persons can practice by use of the above-mentioned musical instrument equipped with an automatic performance function. However, if they stick to the approach of practicing a predetermined music piece repetitively with the aid of the instrument's automatic performance, there would arise the problems that their skill acquired through the practice can not be applied to any other compositions than the predetermined music piece and they easily get tired of the stereotyped practice.

SUMMARY OF THE INVENTION

It is therefore an object of the present invention to provide a musical performance practicing device and method which allows a trainee player to practice performing a predetermined training music piece without getting tired of the practice and also apply a skill acquired through the practice to performance of other music pieces.

In order to accomplish the above-mentioned object, the present invention provides a musical performance practicing device which comprises: a designating section that designates a target music piece which a player aims to perform; a lesson information supplying section that supplies lesson information to be used for practice in performing the target music piece designated by the designating section, the lesson information being prepared by combining information descriptive of a plurality of training music pieces having particular relations to the target music piece; and a control section that controls player's performance practice on the basis of the lesson information supplied by the lesson information supplying section.

The target music piece is one which a trainee player aims to perform well through practice and which is selected, by a user or player operating the designating section, from among music pieces of various genres such as classical music, popular music and enka (Japanese popular ballads). Although an average performance skill may be acquired using an training music piece of a music genre other than that of the target music piece, the traditional style of musical performance practice would take great amounts of time and training effort to become proficient enough for performing the target music piece, because it was customary to repetitively practice performing the whole of such an other-genre training music piece or to practice performing only a portion of the training music piece. Further, because most of the persons who do this kind of practice have little knowledge of music, it is difficult for them to judge what kind of music piece and what kind of phrase of the music piece should be selected in order to achieve fruitful practice. Thus, to allow the player to acquire a skill necessary for performing the target music piece in a shorter time and with a smaller amount of training effort, the lesson information employed in this invention is constructed by appropriately combining information of a plurality of optimum training music pieces selected on the basis of various kinds of musical factors, such as a music genre, key, rhythm and beat, of the target music piece. It will be appreciated that the lesson information may be one previously made in accordance with the target music piece or may be constructed through software means using a database. Further, the lesson information may be formulated so as to allow training music pieces to be selected taking user's preference into account. In this manner, a performance skill acquired through the practice according to the present invention can be effectively applied to performance of other music pieces than the target music piece, and the trainee player can continue doing performance practice without getting tired of the practice.

In a preferred implementation of the invention, the training music pieces included in the lesson information are other than the designated target music piece but at least appear to be useful for the player to acquire a skill necessary for performing the target music piece. To allow the trainee player to acquire the necessary skill, such training music pieces are selected which require special fingering, such as overcross-fingering, undercross-fingering and successive depression of a same key, and the lesson information is constructed on the basis of the thus-selected training music pieces. Because the training music pieces included in the lesson information are different from the designated target music piece, the trainee player can continue practicing without getting tired of the practice, and it is possible for the player to acquire the skill necessary for performing the target music piece in a short time and with a small amount of training.

In a preferred implementation, the training music pieces included in the lesson information are classified into a plurality of groups according to levels of performance skill required for performance of the training music pieces. Players who aim to perform a particular target music piece may greatly vary in their performance ability; that is, some of the players may already have a certain level of performance skill in a musical instrument in question and other players may not have any experience in playing the musical instrument. By classifying the training music pieces included in the lesson information into a plurality of groups by the levels of required performance skill as proposed here, each of the players of different performance levels can start performance practice with an optimum training music (which fits his or her current level of performance skill) and then continue practicing up to higher levels on a step-by-step basis.

Each of the training music pieces included in the lesson information may comprise accompaniment information and melody information and at least a performance based on one of the accompaniment information and melody information can be muted depending on a desired content of training. Because each of the training music pieces in the lesson information bearing close relations to the target music piece comprises accompaniment information and melody information, high-level training can be readily had by just muting at least one of automatic performances based on the accompaniment information and melody information. Namely, a part (melody or accompaniment part) to be practiced can be silenced or muted so that the player is allowed to practice performance without being aided by an automatic performance of the melody or accompaniment part, and thus the player can readily advance to higher training levels or stages.

In a preferred implementation, the musical performance practicing device further comprises a training music piece selecting section that designates one of the training music pieces for performance practice of the designated training music piece. Thus, the player is allowed to designate any desired training music piece and then practice performing the designated training music piece. This arrangement will be very helpful, for example, when the player wants to jump over a next training music piece to another one or when the player, already having a relatively high performance skill, wants to start performance practice with a training music piece relatively difficult to play, skipping a fundamental training music piece.

The lesson information supplying section may prepare the lesson information by extracting training music pieces from among a composition information database on the basis of the target music piece designated by the designating section. Whereas lesson information previously made in accordance with the target music piece can be used in the present invention, the lesson information may be constructed using a composition information database containing a plurality of items of composition information that are descriptive of a plurality of training music pieces. Because any desired one of the training music pieces can be selected from among the database in this case, the user or player is allowed to do performance practice using his or her favorite training music piece. Alternatively, the lesson information may be constructed by accessing, via a communication network, a server containing such a database and then designating a target music piece.

The present invention also provides a musical performance practicing method that is characterized by, in response to designation of a target music piece which a player aims to perform, executing in optionally selected order the steps of: causing the player to practice performance operation relating to the target music piece while automatically performing a training music piece that bears a particular relation to performance operation necessary for the target music piece; causing the player to practice a rhythm performance relating to a rhythm of the target music piece while automatically performing a training music piece that bears a particular relation to the rhythm of the target music piece; causing the player to practice at least one of the performance operation and rhythm performance relating to the target music piece while automatically performing a partial phrase of a music piece other than the target music piece that bears a particular relation to the target music piece; causing the player to practice performance of the target music piece itself.

Designation of a target music piece which the trainee player aims to perform determines training music pieces to be used in the individual training steps. This method is arranged to allow the order of the training steps to be changed as desired by the user or player. More specifically, the user or player is allowed to change the order of the four training steps: one where the player is caused to practice performance operation relating to the target music piece; one where the player is caused to practice a rhythm performance relating to a rhythm of the target music piece; one where the player is caused to practice at least one of the performance operation and rhythm performance relating to the target music piece while automatically performing a partial phrase of a particular music piece; and one where the player is caused to practice performance of the target music piece itself. With this arrangement, the player can start the performance practice with any desired one of the training steps depending on a current level of his or her performance skill. Beginner-class player is allowed to practice on a step by step basis starting with fundamental training.

Each of the above-mentioned training steps is arranged to provide performance practice using either or both of melody information and accompaniment information. As another implementation, each of the training music pieces may comprise melody information and accompaniment information, and each of the steps may be arranged to cause the player to practice performance with regard to at least one of the melody information and accompaniment information. According to this arrangement, each of the training music pieces includes at least melody information and accompaniment information so that the player in each of the training steps is allowed to practice using one of the melody information and accompaniment information that is not automatically performed as a performance guide. Namely, in the step of causing the player to practice a rhythm performance, the player can of course do practice using only the accompaniment information of the training music piece in question, or the player can practice using only the melody information or both of the accompaniment information and the melody information. Thus, it is possible to freely provide wider variations of the training at discretion of the user, and the player can continue practicing without getting tired of the practice.

The present invention also provides a recording medium containing lesson information, wherein to allow a player to acquire a skill for performing a target music piece, the lesson information is constructed by combining information descriptive of a plurality of training music pieces bearing relations to the target music piece, and wherein the training music pieces included in the lesson information at least appear to be useful for the player in acquiring a skill necessary for performing the target music piece. Namely, the recording medium contains the lesson information to be used in the above-described inventive arrangements.

In the recording medium, each of the training music pieces included in the lesson information may comprise accompaniment information and melody information and may be arranged in such a manner that at least a performance based on one of the accompaniment information and melody information can be muted depending on a desired content of practice. The lesson information may be prepared by selecting information descriptive of training music pieces from among a composition information database on the basis of the target music piece.

The present invention also provides a recording medium containing lesson information, wherein the lesson information includes: information descriptive of one or more target music pieces; information descriptive of a training music piece that corresponds to any one of the target music pieces and bears a particular relation to performance operation for the corresponding target music piece; information descriptive of a training music piece that corresponds to any one of the target music pieces and bears a particular relation to a rhythm of the corresponding target music piece; and information descriptive of a partial phrase of a training music piece that corresponds to any one of the target music pieces and bears a particular relation to performance operation for the corresponding target music piece. Namely, this recording medium contains lesson information that is descriptive of the target music piece, training music pieces, partial phrase, etc. for use in the above-described musical performance practicing method. In a preferred implementation, the lesson information may be constructed by selecting information descriptive of training music pieces from among a composition information database on the basis of the one or more target music piece.

The present invention may be arranged and implemented as a method invention as well as a device invention. Namely, the inventive concept as embodied in the musical performance practicing device having been set forth in this summary portion may be embodied also as a musical performance practicing method. Conversely, the inventive concept as embodied in the musical performance practicing method having been set forth in this summary portion may be embodied also as a musical performance practicing device. Further, the present invention may be implemented as a computer program and as a recording medium containing such a computer program. Furthermore, the present invention may be implemented as a recording medium that contains unique combinations of training music piece data.

BRIEF DESCRIPTION OF THE DRAWINGS

For better understanding of the above and other features of the present invention, the preferred embodiments of the invention will be described in greater detail below with reference to the accompanying drawings, in which:

FIGS. 3A to 3D are diagrams showing exemplary scores of composition information 1 to composition information 4;

FIGS. 4A to 4E are diagrams showing exemplary scores of composition information 5 to composition information 8;

FIG. 5 is a diagram showing an exemplary score of composition information 9;

FIG. 6 is a diagram showing an exemplary score of composition information 10;

FIG. 7 is a diagram showing an exemplary score of composition information 11;

DETAILED DESCRIPTION OF THE PREFERRED EMBODIMENTS

Figure 2:
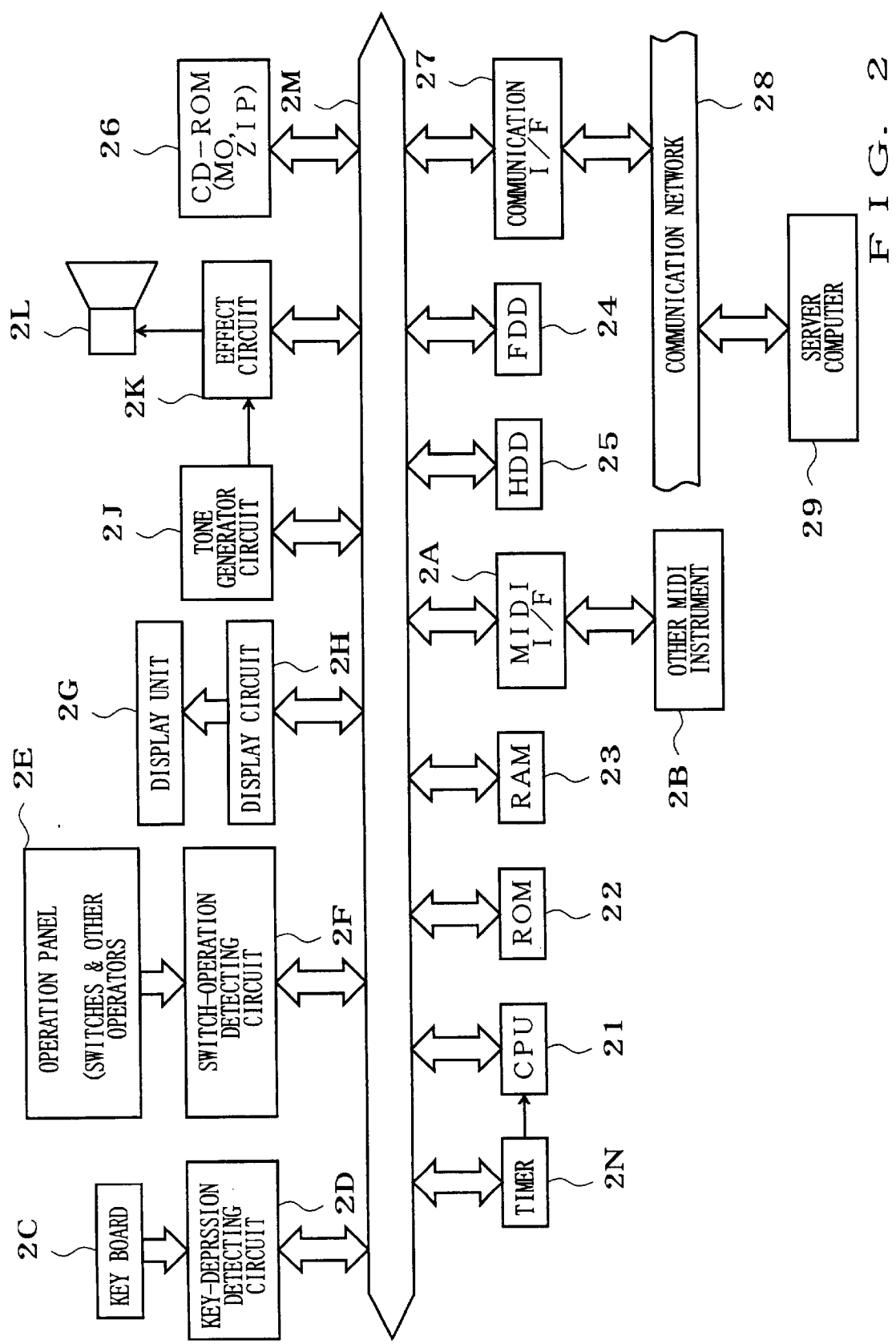
FIG. 2 is a block diagram showing an exemplary hardware setup of an electronic musical instrument which contains a musical performance practicing device in accordance with an embodiment of the present invention.

FIG. 2 is a block diagram showing an exemplary hardware setup of an electronic musical instrument which contains an automatic performance device and a musical performance practicing device in accordance with an embodiment of the present invention. In this embodiment, various processes are carried out under the control of a microcomputer that includes a microprocessor unit (CPU) 21, a program memory (ROM) 22 and a working memory (RAM) 23.

The embodiment will be described hereinbelow in relation to a case where processes relating to musical performance practice are executed via the single CPU 21 that controls overall operations of the electronic musical instrument. Via a data and address bus 2M, various elements are connected to the CPU 21, such as a key-depression detecting circuit 2D, a switch-operation detecting circuit 2F, a display circuit 2H, a tone generator circuit 2J, an effect circuit 2K, a floppy disk drive (FDD) 24, a hard disk drive 25, a CD-ROM drive 26, a MIDI interface (I/F) 2A, a communication interface (I/F) 27 and a timer 2N, in addition to the above-mentioned program memory 22 and working memory 23.

The CPU 21 controls the overall operations of the electronic musical instrument on the basis of various programs and data stored in the program memory 22 and working memory 23. Whereas the preferred embodiment will be described as being provided with the floppy disk drive (FDD) 24, hard disk drive (HDD) 25 and CD-ROM drive 26 as external storage devices, the external storage devices may further include an magneto-optical disk (MO) drive, a ZIP drive and/or a PD (Phase change Disk) drive. Further, MIDI data etc. may be received from another MIDI instrument 2B or the like via the MIDI interface 2A.

The CPU 21 also supplies the tone generator circuit 2J with MIDI data received from any one of the external storage devices or generated in response to key depression on a keyboard 2C by a user or player so that the tone generator circuit 2J generates a tone on the basis of the supplied MIDI data. Alternatively, tone generating processing may be executed by use of an external tone generator.

The program memory 22, which is a read-only memory, has prestored therein various operating programs to be run by the CPU 21, performance information corresponding to a plurality of accompaniment styles (hereinafter referred as style data), a note conversion table and various parameters and data. The RAM 23, which is for temporarily storing various data generated as the CPU 21 executes the programs, is provided in predetermined address regions of a random access memory (RAM) and used as various registers, flags, etc.

Further, in stead of the operating programs and various data being stored in the ROM 22, any one of the external storage devices, such as the CD-ROM drive 26, may prestore the operating programs and various data such as automatic performance data, chord progression data and tone waveform data. The operating programs and various data may be transferred to the RAM 23 or the like for storage therein. This alternative arrangement greatly facilitates version-up of the operating program, addition of a new operating program, etc.

The communication interface 27 may be connected to the data and address bus 2M of the electronic musical instrument so that the instrument can be connected via the interface 27 to a desired communication network, such as a LAN (Local Area Network), Internet or telephone network, to exchange data with a sever computer 29. Thus, the operating programs and data can be downloaded from the server computer 29. In such a case, the automatic performance device, which is a "client" tone generating device, sends a command requesting the server computer 29 to download a desired operating program and data by way of the communication interface 27 and communication network 28. In response to the command, the server computer 29 delivers the requested operating program and data to the automatic performance device via the communication network 28. The automatic performance device receives the operating program and data via the communication interface 27 and accumulatively store them into the hard disk device 25. In this way, the necessary downloading of the operating program and various data is completed.

It will be appreciated that the present invention may be practiced by means of a commercially available personal computer or the like having preinstalled therein the operating programs and various data corresponding to the invention. In such a case, the operating programs and various data corresponding to the invention may be supplied to users in a recording medium, such as a CD-ROM or floppy disk, readable by a personal computer. Further, in a situation where the personal computer or the like is connected to a communication network such as a LAN, Internet or telephone network, the operating programs and various data may be supplied to the personal computer or the like via the communication network.

The keyboard 2C, which is connected to the key-depression detecting circuit 2D, has a plurality of keys for designating a pitch of each tone to be generated and key switches provided in corresponding relation to the keys. Depending on the application, the keyboard 2C may also include a key-touch detecting means such as a key-depression velocity (or force) detecting device. Any other performance operator may be employed in the automatic performance device in place of or in addition to the keyboard 2C, although the embodiment will be described here as employing the keyboard 2C since the keyboard is a fundamental performance operator easy to understand.

The key-depression detecting circuit 2D, which comprises a plurality of key switch circuits corresponding to the keys on the keyboard 2C, outputs a key-on event signal upon detection of each newly depressed key and a key-off event signal upon detection of each newly released key, as well as note numbers indicative of pitches of the keys where the key-on and key-off events have occurred. The key-depression detecting circuit 2D also generates velocity data and after-touch data by determining a key-depression velocity or force.

Operation panel 2E is connected to the switch-operation detecting circuit 2F which detects operational states of various switches and operators on the operation panel 2E to output switch event signals corresponding to the detected states to the CPU 21 via the data and address bus 2M.

On the operation panel 2E, there are provided genre switches, a performance start/stop switch, a NEXT switch, a BACK switch, switches for selecting a lesson number and/or a section number, etc, as will be later described in detail. Although not specifically shown or described here, the operation panel 2E includes various other switches and operators, such as those for selecting, setting and controlling volume, pitch, effect, etc. of each tone to be generated.

The genre switches allow the user or player to select a genre of a target music piece which the player aims to perform, and thus they are provided in corresponding relation to a variety of music genres such as enka (Japanese popular ballads), popular music and classical music. In an alternative, ten-keys and cursor may be used to select a desired one of the music genres.

The performance start/stop switch, which is typically labelled "START/STOP", turns on or off an automatic performance each time it is actuated. The NEXT switch functions to advance a lesson to a next stage each time it is actuated, and the BACK switch functions to move the lesson to a preceding stage. The switches for selecting a lesson number and/or a section number are provided to select a desired lesson number and section number. Whereas actuation of the NEXT or BACK switch can only move the lesson and section ahead or backward sequentially stage by stage, actuation of the switches for selecting a lesson number and/or a section number switches permits a quick jump to any desired lesson number and section number.

Display circuit 2H controls displayed contents on a display unit 2G; for example, a musical score is shown on the display unit 2G in a score display mode. The display unit 2G may be a liquid crystal display (LCD) or any other suitable display and its operation is controlled by the display circuit 2H.

The tone generator circuit 2J is capable of simultaneously generating tone signals in a plurality of channels on the basis of performance information (data based on the MIDI standards) given from the CPU 21 via the data and address bus 2M.

The tone generation channels to simultaneously generate tone signals in the tone generator circuit 2J may be implemented by using a single circuit on a time-divisional basis or by providing a separate circuit for each of the channels. Any known tone signal generation method may be used in the tone generator circuit 2J depending on an application. For example, any conventionally known tone signal generation method may be used such as: the memory readout (waveform memory) method where tone waveform sample value data stored in a waveform memory are sequentially read out in accordance with address data that vary in accordance with a pitch of a tone to be generated; the FM method where tone waveform sample value data are obtained by performing predetermined frequency modulation operations using the above-mentioned address data as phase angle parameter data; or the AM method where tone waveform sample value data are obtained by performing predetermined amplitude modulation operations using the above-mentioned address data as phase angle parameter data. Other than the above-mentioned, the tone generator circuit 2J may also use the physical model method where a tone waveform is synthesized by algorithms simulating a tone generation principle of a natural musical instrument; the harmonics synthesis method where a tone waveform is synthesized by adding a plurality of harmonics to a fundamental wave; the formant synthesis method where a tone waveform is synthesized by use of a formant waveform having a specific spectral distribution; or the analog synthesizer method using VCO, VCF and VCA. Further, the tone generator circuit 2J may be implemented by a combined use of a DSP and microprograms or of a CPU and software programs, rather than by use of dedicated hardware.

Timer 2N generates tempo clock pulses for counting a time interval and setting an automatic performance tempo. The frequency of the tempo clock pulses may be set and adjusted via a tempo switch (not shown) on the operation panel 2E. Each tempo clock pulse generated by the timer 2N is fed to the CPU 21 as an interrupt instruction, in response to which the CPU 21 interruptively carries out various operations in an automatic performance. Effect circuit 2K imparts various effects to tone signals generated by the tone generator circuit 2J and supplies the effect-imparted tone signals to a sound system 2L, which audibly reproduces or sounds them via amplifiers and speakers.

The electronic musical instrument is further provided with a key position indicator that guides a player in a performance by indicating each key to be operated in relation to a training music piece. The key position indicator may be of any conventionally known type. Most typically, the key position indicator may comprise a plurality of guide lamps provided in corresponding relation to the keys on the keyboard 2C so that each of the keys to be operated is indicated by illuminating the corresponding guide lamp. As another example of the key position indicator, unique numbers of player's fingers to be used for operating the keys may be visually shown at respective pitch locations in a score of the training music piece displayed on the display unit 2G. As still another example of the key position indicator, fingers to be used for operating the keys may be presented on a score in printed form.

Figures 1A, 1B:
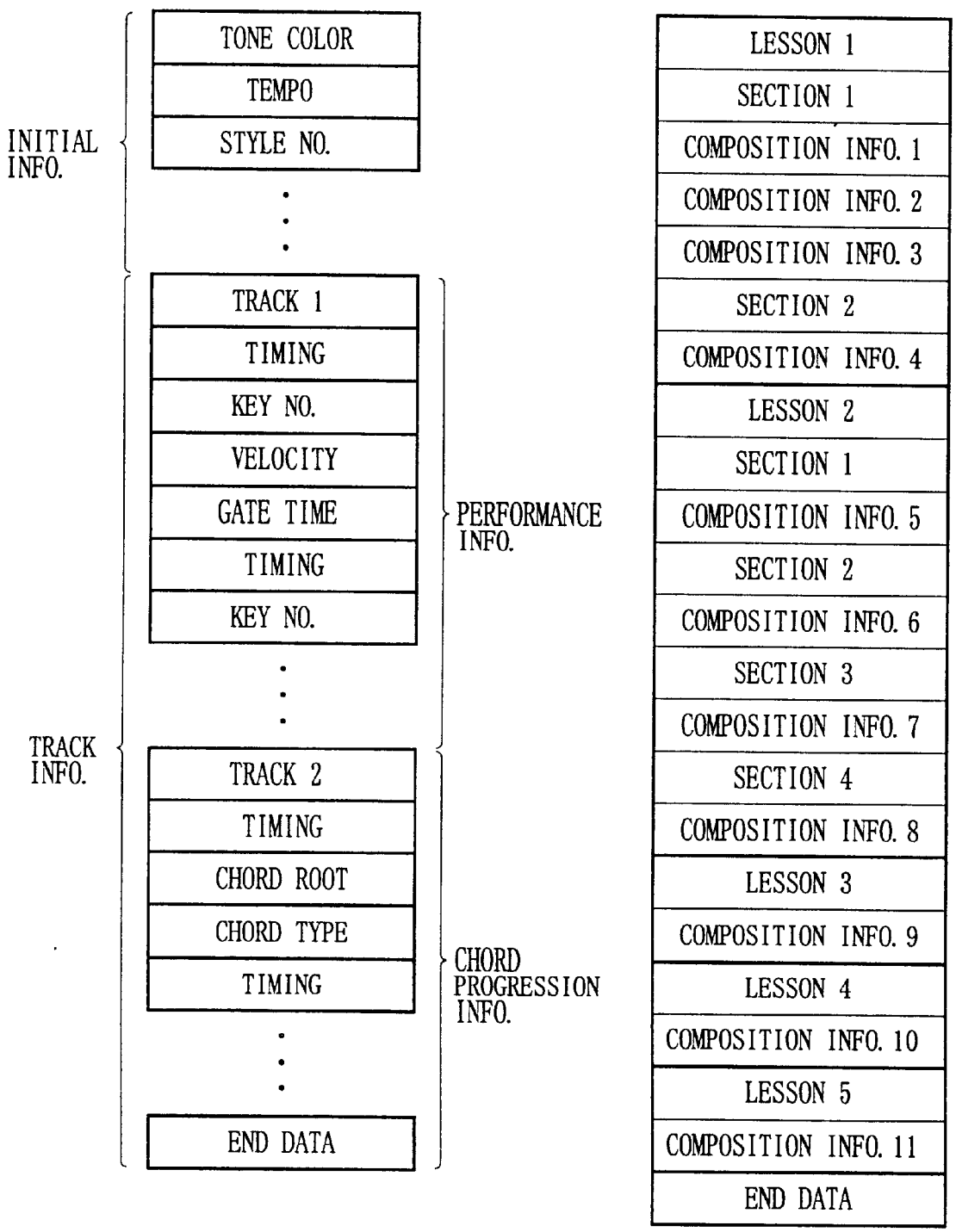
FIGS. 1A and 1B are diagrams showing exemplary formats of data and information employed in the present invention.

FIG. 1A is a diagram showing an exemplary data format of composition information employed in the embodiment. As shown, each composition information comprises initial information and track information. The initial information includes data on initial settings of a music piece performance, such as a tone color, performance tempo and style number. Here, the style number designates a set of style data, of an accompaniment to be performed along with the music piece, from among a plurality of sets of style data stored in the above-mentioned ROM 22; note that a unique style number is allocated to each of the sets of the style data. Each of the sets of the style data, originally stored in the ROM 22 in a basic scale of C major, will be sounded after being pitch-converted on the basis of chord progression information as described below. The initial information includes various other data, although not specifically described herein.

The track information includes information of track 1 relating to a melody performance and information of track 2 relating to a chord progression. The melody performance information of track 1 is composed of a combination of timing data, key number data, velocity data and gate time data, which are stored time-serially in accordance with the music piece to be performed. The timing data represents a time interval between successive events, the key number data is one relating to a pitch of a tone to be generated, the velocity data is one relating to a volume of the tone to be generated, and the gate time data is one relating to a time period over which the tone should continue to be generated.

The chord progression information of track 2 is composed of a combination of timing data, chord root data and chord type data, and this chord progression information is used to pitch-convert the performance information corresponding to style data that are designated by style numbers sequentially read out during reproduction of a performance. The chord root data represents a root of a chord by a note name such as "C", "C sharp", "D flat" or "D". Here, the chord root data represents any one of 17 different chord roots so as to distinguish between sharp notes and flat notes; for example, chord roots "C", "C sharp", "D flat", "D", "D sharp", "E flat" and "E" are represented by chord root data "0", "1", "2", "3", "4", "5" and "6", respectively. The chord type data relates to a chord character and represents a chord type such as a major or minor.

In addition to the performance information and chord progression information, the track information includes event data relating to pitch bend control, volume control, etc., although no detailed description of the event data is made herein. Further, instead of storing the above-mentioned chord progression information and style numbers, the melody performance information and accompaniment performance information may be sequentially recorded on track 1 and track 2, respectively, because in this case the player is allowed to practice performing an accompaniment on the basis of the accompaniment performance information.

FIG. 1B is a diagram showing an exemplary organization of lesson information representing contents of lessons that are necessary for acquiring a skill to perform a particular target music piece. In this embodiment, a plurality of different target music pieces are set for each of the music genres, such as enka (Japanese popular ballads), popular music and classical music, selectable via the above-mentioned genre switches, so that lesson information as shown in FIG. 1B can be automatically prepared or constructed in response to user's designation of one of the target music pieces. The lesson information can be customized freely by the user, as will be later described in detail.

The lesson information includes lesson numbers each indicative of a type of lesson, section numbers each indicative of an itemized section within one of the lessons, and one or more items of composition information. In the illustrated example, the lesson information covers five-stage lessons, i.e., lesson 1 to lesson 5. The lesson number is allocated to each type of lesson, and the lesson information of each of the selectable music genres covers five-stage lessons. Some of the section numbers and items of composition information are shared among the individual music genres, while the other section numbers and items of composition information are different between the music genres.

Lesson 1 concerns a keyboard lesson, lesson 2 a phrase lesson, lesson 3 an accompaniment (single-fingered accompaniment) lesson, lesson 4 a lesson for simultaneous performance of melody and accompaniment parts, and lesson 5 a lesson for a target music piece. The selection number, which is a unique number allocated to each training item in one of the lessons, is used to select a desired training item in the lesson.

In FIG. 1B, lesson 1 is composed of section 1 and section 2. Section 1 of lesson 1 designates composition information 1 to composition information 3 for the keyboard lesson corresponding to the target music piece, while section 2 of lesson 1 designates composition information 4 for a rhythm lesson corresponding to the target music piece.

Lesson 2 is composed of composition information 1 to composition information 4 for the phrase lesson, and a section number is allocated to each of the four composition information. Lesson 3 to lesson 5 are each composed of a single piece of composition information. Composition information of lesson 1 to lesson 5 is descriptive of musical pieces having particular relations to the target music piece which, in the illustrated example, corresponds to composition information 11 of lesson 5. The following paragraphs describe examples of such particular relations to the target music piece, with reference to actual musical scores of FIG. 3.

Figures 7A, 7B, 7C:
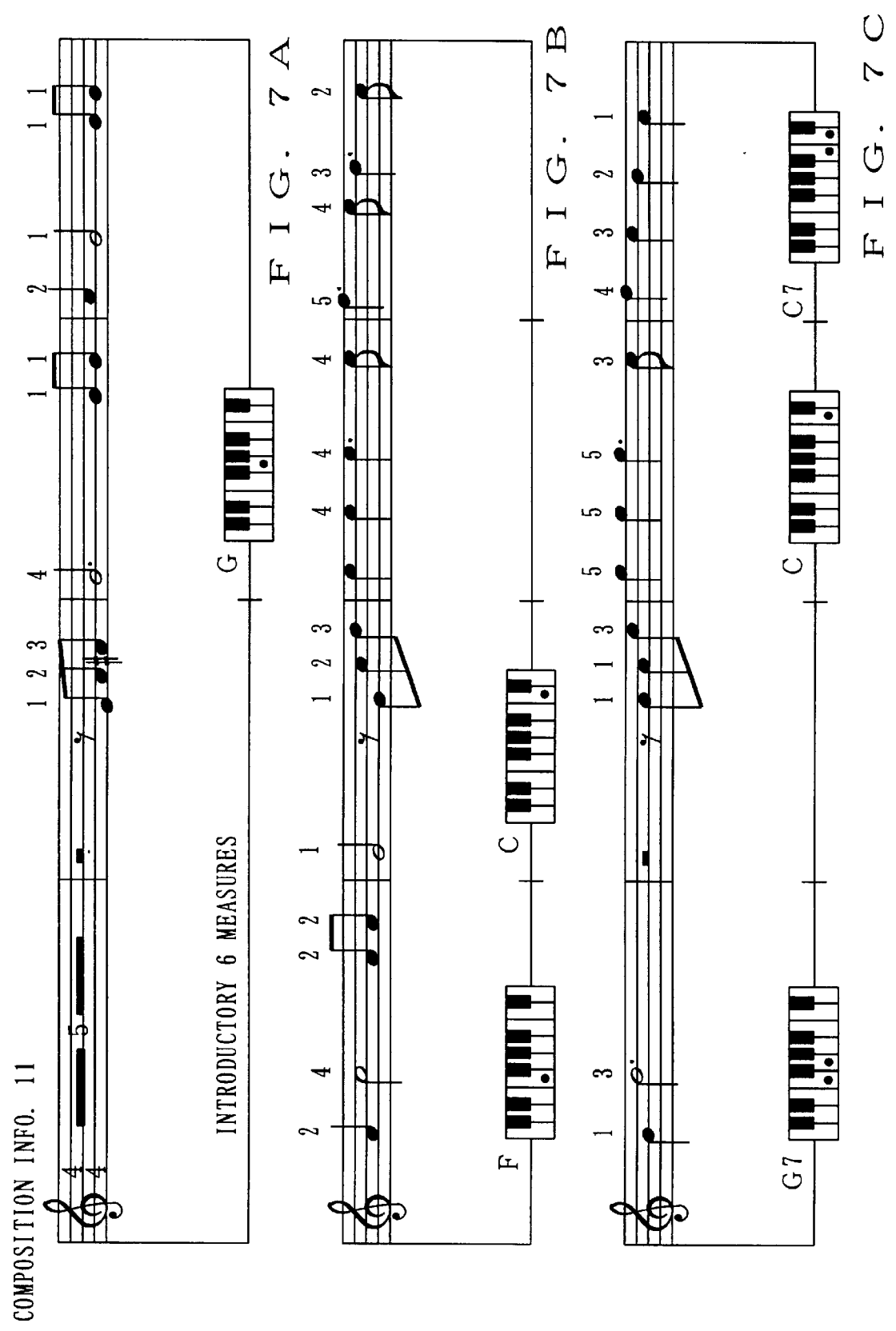

Composition information 11 of lesson 5 is descriptive of the target music piece which the trainee player aims to perform well. In the illustrated example, the target music piece (composition information 11) is the "Green Green Grass of Home" which belongs to the genre of popular music and is in C major key. Beginning part of the score of this target music piece is shown in FIG. 7. Then, a selection is made of music pieces having training patterns necessary for performing the target music piece of FIG. 7, so that lesson information as shown in FIG. 1B is constructed of the thus-selected music pieces.

Figures 3A, 3B, 3C, 3D:
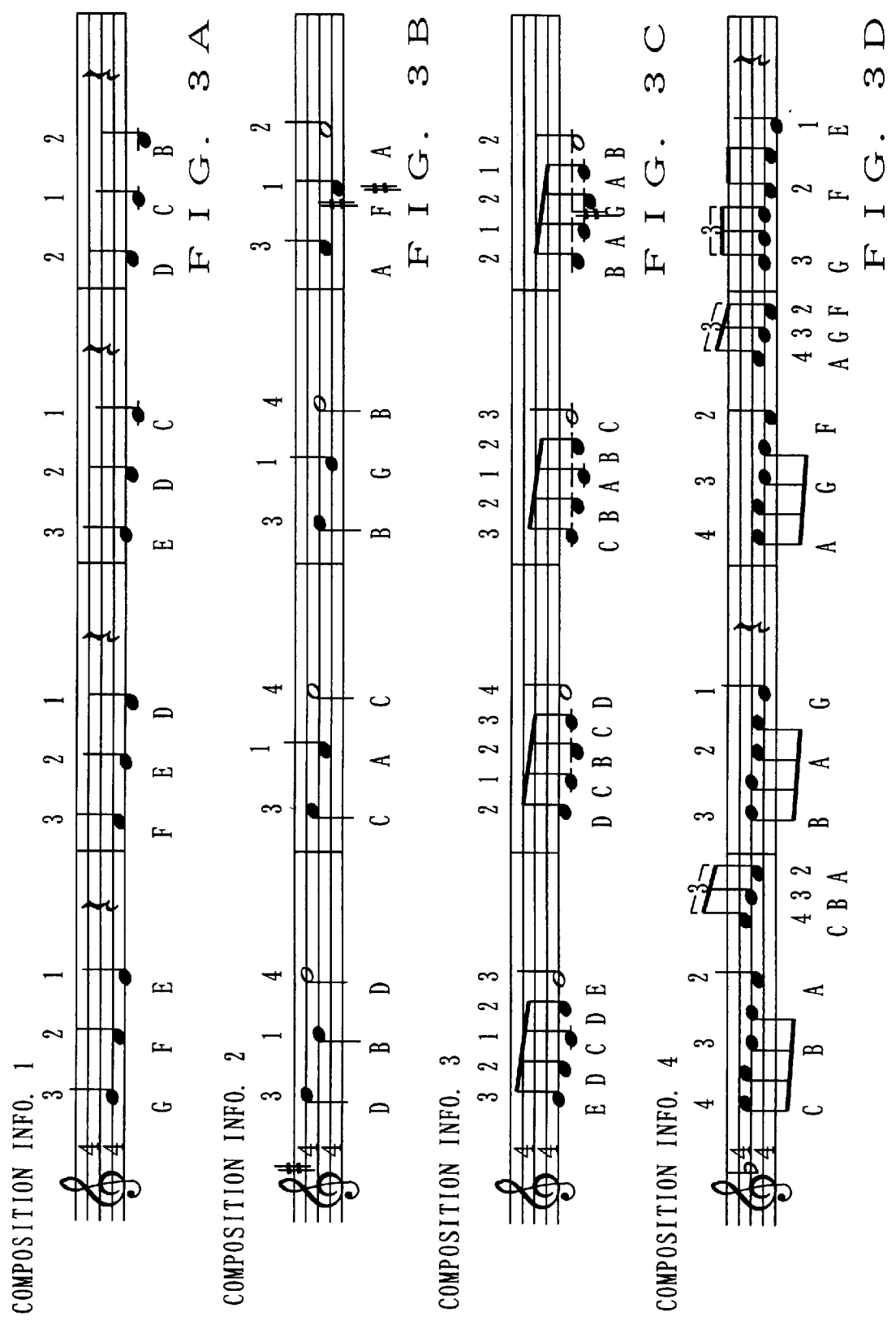

Composition information 1 to composition information 3 is intended for training in manual keyboard manipulation or operation corresponding to the key (C major) of the target music piece. These composition information includes not only composition information identical in key to the target music piece, but also composition information of other keys that contain notes not present in the key of the target music piece as well as composition information of minor or major key that contains same notes as the target music piece. FIGS. 3A to 3C show examples of scores for composition information 1 to composition information 3.

Composition information 1 shown in FIG. 3A describes a training music piece that is in the same key (i.e., C major) as the target music piece. This training music piece is chosen for the training purpose in the embodiment, because it contains a region of notes "D"-"C"-"B" in the fourth measure which requires special overcross-fingering; more specifically, the key corresponding to the last note "B" in the fourth measure has to be depressed with the number "2" finger overcrossing the number "1" finger as denoted in the figure by a succession of finger numbers "2"-"1"-"2".

Composition information 2 shown in FIG. 3B describes a training music piece in the G major key which contains note name "F♯" not present in the C major key of the target music piece but whose other note names are similar to those of the C major key. This training music piece is chosen for the training purpose in the embodiment, because it contains a region of notes "A"-"F♯"-"A" in the fourth measure which requires special overcross-fingering; more specifically, the key corresponding to the last note "A" in the fourth measure has to be depressed with the number "2" finger rather than the number "3" finger as denoted in the figure by a succession of finger numbers "3"-"1"-"2". The reason why the number "2" finger has to be used to depress the key corresponding to the last note "A" is that the key corresponding to the first note in the first measure is to be depressed next with the number "3" finger.

Composition information 3 shown in FIG. 3C describes a training music piece in the A minor key which contains same note names as in the C major key of the target music piece. This training music piece is chosen for the training purpose in the embodiment, because it contains a region of notes "D"-"C"-"B"-"C"-"D" in the second measure where the key corresponding to the note "B" has to be depressed with the number "2" finger overcrossing the number "1" finger as denoted in the figure by a succession of finger numbers "2"-"1"-"2"-"3"-"4", and another region of notes "B"-"A"-"G♯"-"A"-"B" in the fourth measure where the key corresponding to the note "G♯" has to be depressed with the number "2" finger overcrossing the number "1" finger as in composition information 1 and as denoted in the figure by a succession of finger numbers "2"-"1"-"2"-"1"-"2".

Because music pieces of various keys, both major and minor keys, are used as the training music pieces so as to give various different feelings, such as a cheerful feeling by the major keys and a gloomy feeling by the minor, the trainee player can enjoy practicing the manual keyboard manipulation without getting tired of the practice. Further, because the keys of the training music pieces have particular relations as mentioned to the key of the target music piece, to practice performing the training music pieces could become a substantial practice in the manual keyboard manipulation for the target music piece. Furthermore, for each of the training music pieces, a particular set of style data for accompaniment performance is preset which would fit the key of the training music piece. In the keyboard lesson, even a beginner-class player can easily practice the keyboard manipulation if style data, representing accompaniment styles having a relatively low performance tempo such as that of the waltz, are preset for the training music pieces. In any case, it is a matter of course that the user is allowed to freely change the accompaniment styles whenever necessary.

Further, section 2 of lesson 1 designates composition information 4 that is intended to give training in a performance rhythm of the target music piece. As composition information 4 is chosen such information descriptive of a training music piece that is of a rhythm using many eighth notes and sixteenth notes or of a rhythm using triplets, syncopation and swing performance style. FIG. 3D shows an exemplary score of composition information 4 in section 2 of lesson 1, which describes a training music piece using many eighth notes and sixteenth notes. Accompaniment styles to be for performance of composition information 4 are designed to fit individual types of training; for example, for training in swing performance, an accompaniment style of jazz or the like may be selected.

Composition information 5 to composition information 8 designated in section 1 to section 4 of lesson 2 represents, as four training music pieces, selected portions or phrases of well-known music pieces other than the target music piece, and these four training music pieces are designed to allow the trainee player to acquire a skill, necessary for performance of the target music piece, without diminishing his or her eagerness for practice. FIGS. 4A and 4B show an exemplary score of composition information 5, and FIGS. 4C, 4D and 4E show exemplary scores for composition information 6, composition information 7 and composition information 8, respectively.

Composition information 5 shown in FIGS. 4A and 4B describes a training music piece which can be performed relatively easily without using a special fingering technique such as overcross-fingering, and an eight-measure phrase of the "La Reine De Saba" is chosen as this training music piece.

Composition information 6 shown in FIG. 4C describes a training music piece which requires a technique of overcross-fingering between the thumb and the index finger, and a four-measure phrase of the "Lover Come back to Me" is chosen as this training music piece. Specifically, in this training music piece, a region of "D"-"F"-"G" of the first measure requires such fingering as denoted by a succession of the finger numbers "2"-"1"-"2".

Composition information 7 shown in FIG. 4D describes a training music piece which requires a technique of successively depressing a same key with different fingers, and a four-measure phrase of a Japanese tune "Okurukotoba" is chosen as this training music piece. Specifically, in this training music piece, a region of "G (dotted quarter note)"-"G (eighth note)"-"G (dotted quarter note)" of the fourth measure requires such fingering as denoted by a succession of the finger numbers "3"-"2"-"1".

Composition information 8 shown in FIG. 4E describes a training music piece which uses many eighth and sixteenth notes and requires the so-called "bounce melody" technique, and a four-measure phrase of a Japanese tune "Osananajimi" is chosen as this training music piece because of its characteristic arrangement of notes. Composition information 8 is designed for practice in fingering full of skipping feels as a whole.

Furthermore, composition information 9 in lesson 3, which is designed to give training in performance of a chord progression close to that of the target music piece, describes a well-known music piece other than the target music piece in a similar manner to composition information 5 to composition information 8 set forth above. Composition information 9 may describe only a selected phrase of the well-known music piece. FIG. 5 shows part of an exemplary score of composition information 9. Such a score may be visually presented on the display unit 2G during the training, or may be presented to the trainee player in a printed form. This composition information is set forth here as giving training in a "single-fingered chord" performance using an auto-bass chord function of the electronic musical instrument, rather than in an actual chord performance. In the "single-fingered chord" performance, a chord progression of a selected accompaniment style is sequentially designated by the player depressing one or two keys in an accompaniment key region on the keyboard.

More specifically, composition information 9 describes a training music piece whose chord progression comprises C, F, G7, Am and Dm chords that are basic chords employed in the chord progression of the target music piece of the C major key. In the illustrated example, a Japanese tune "Kyonohiwa Sayonara" is chosen as the training music piece, and a phrase covering the first eight measures of this Japanese tune is shown in FIG. 5. To provide a chord progression of the selected accompaniment style data, C and F chords are designated by the user depressing keys corresponding to the respective roots of the chords, a seventh chord, such as G7 chord, is designated by depressing a key corresponding to the chord's root along with a white key located immediately to the left of the root-corresponding key, and minor chords, such as Am and Dm, are designated by depressing keys corresponding to the respective roots of the chords along with black keys located immediately to the left of the root-corresponding keys.

Composition information 10 in lesson 4, which is designed to give training in both melody performance and chord progression performance close to those of the target music piece, describes a well-known music piece other than the target music piece in a similar manner to composition information 5 to composition information 9 set forth above. Composition information 10 may describe only a selected phrase of the well-known music piece. FIG. 6 shows part of an exemplary score of composition information 10. This composition information is also designed to automatically perform an accompaniment pattern using the auto-bass chord function of the electronic musical instrument, rather than requiring the player to actually execute a chord performance, in order to give training in both melody performance and chord progression performance with the player's both hands.

More specifically, composition information 10 describes a training music piece which can give training in performance of a rhythm accompaniment close to that of the target music piece, and a Japanese tune "Gakuseigaino Kissaten" is chosen as the training music piece. For each the target music piece "Green Green Grass of Home" and the "Gakuseigaino Kissaten", an "eight-beat" style is designated as the accompaniment style. FIG. 6 shows only a phrase covering the first eight measures of the training music piece.

Composition information 11 describes the target music piece, selected by the user via the operation panel, which in this illustrated example is the "Green Green Grass of Home" and comprises two performance parts for chord progression and melody.

The lesson information in the preferred embodiment has been described as being prestored individually for each of the selectable music genres. However, because fundamental fingering and other performance procedures for keyboard-based musical instruments, such as pianos, as practiced in lesson 1 or lesson 2 have no particular relation to the target music piece in many cases, the lesson information may be constructed roughly of fundamental lesson information such as lesson 1 and applied lesson such as lesson 2, and the composition information directed to the fundamental lesson may be shared between the different music genres. This alternative arrangement can substantially reduce the amount of information descriptive of the training music piece. Performance tempo and the like actually employed in the training may be modified optionally depending on a current level of performance skill of the player.

Now, exemplary processes executed in the musical performance practicing device by means of the CPU 21 will be described with reference to the scores of FIGS. 3 to 7 and flow charts shown in FIGS. 8 to 13.

Figure 8:
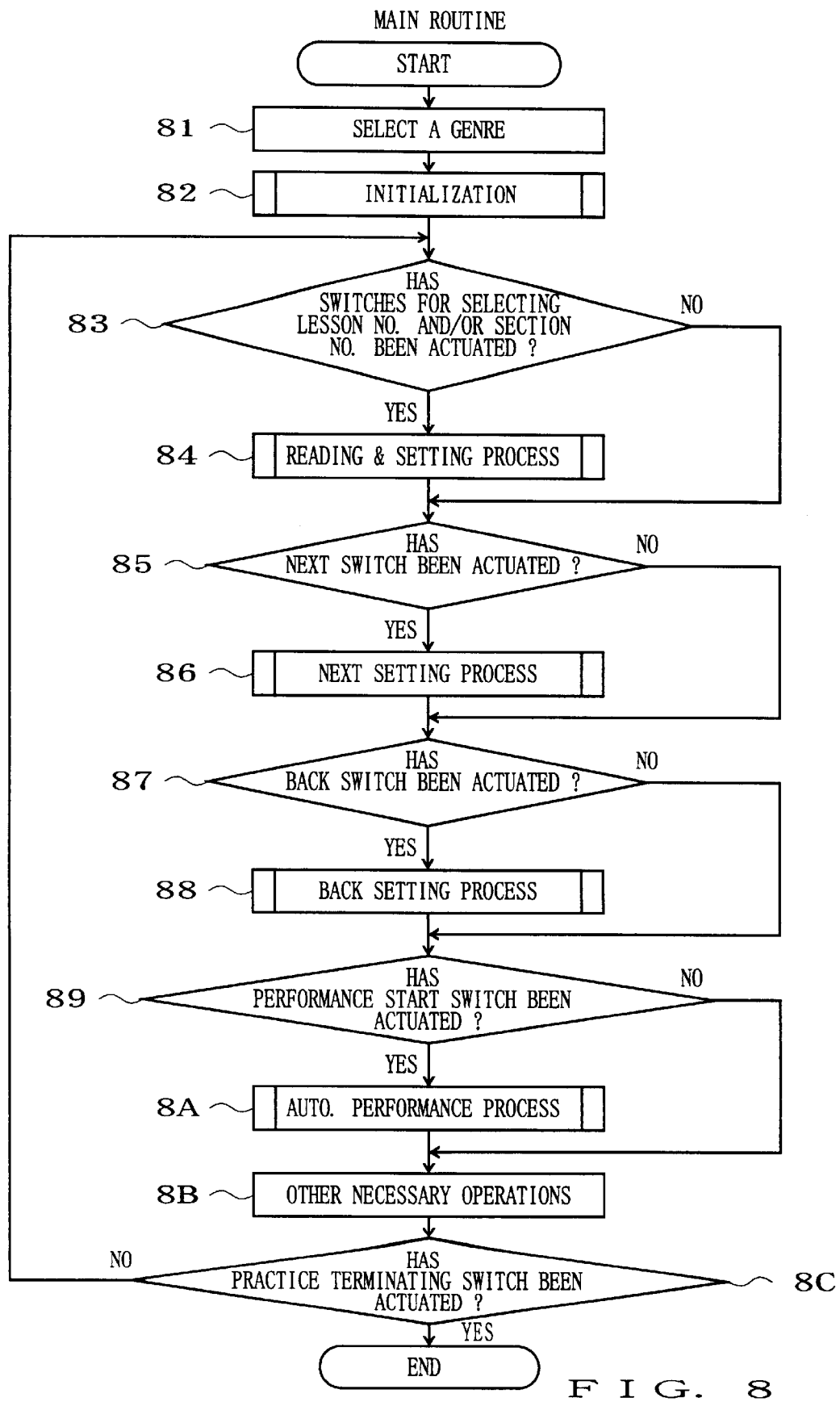
FIG. 8 is a flow chart showing an example of a main routine carried out in the musical performance practicing device of the present invention.
Figure 9:
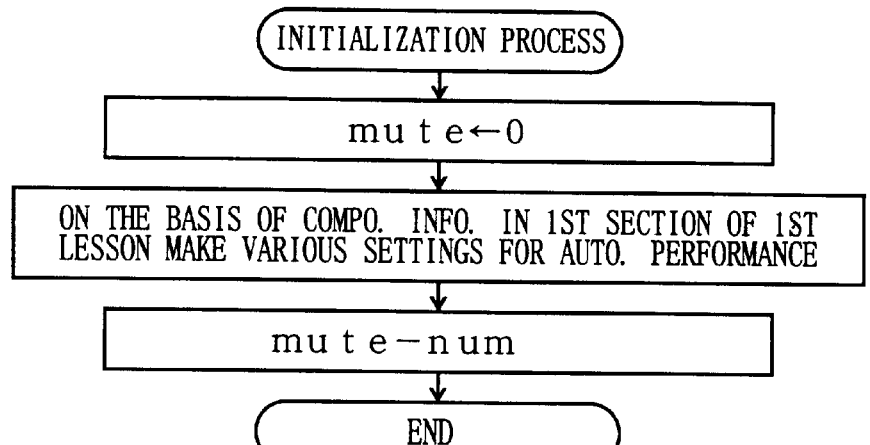
FIG. 9 is a flow chart showing an example of an initialization process shown in FIG. 8.
Figure 10:
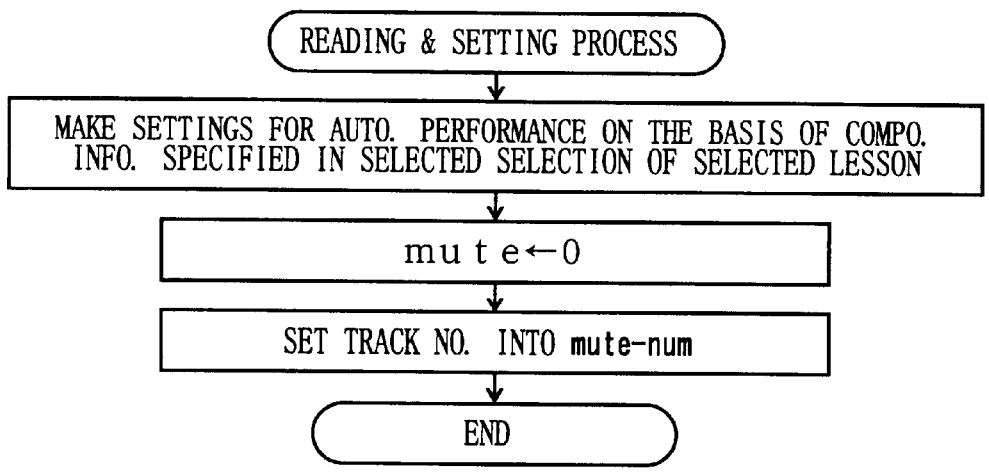
FIG. 10 is a flow chart showing an example of a reading and setting process shown in FIG. 8.
Figure 13:
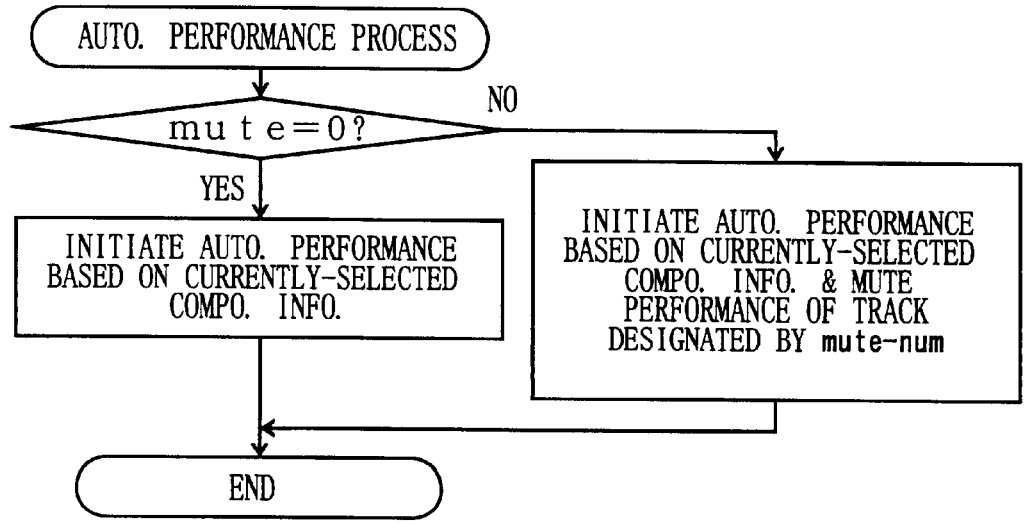
FIG. 13 is a flow chart showing an example of an automatic performance process shown in FIG. 8.
Figure 11:
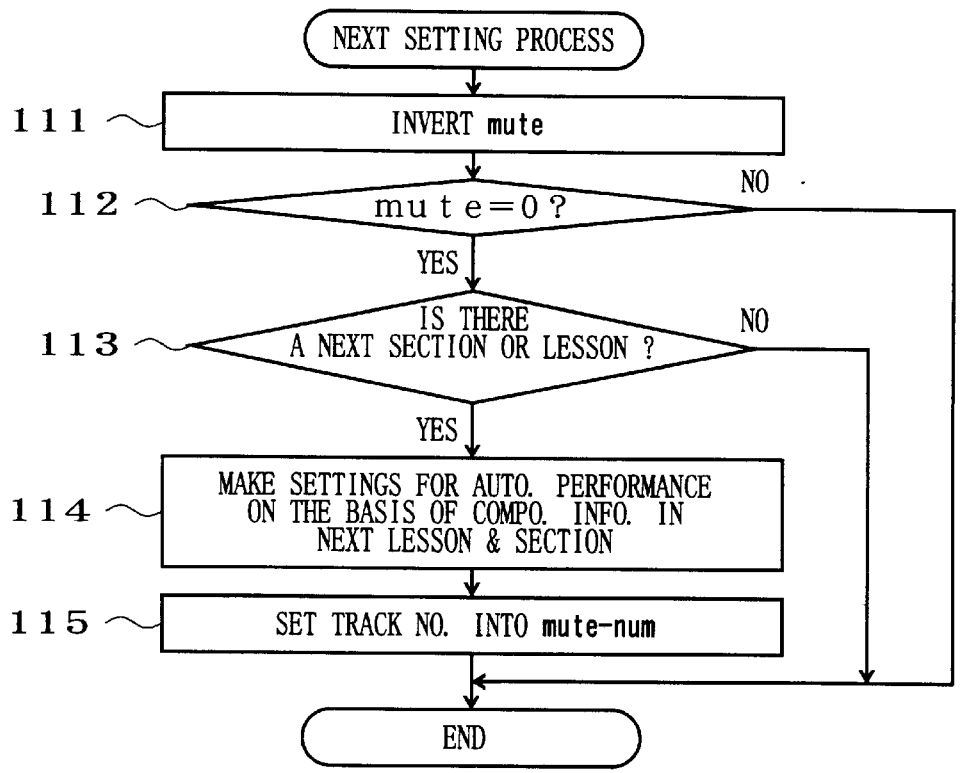
FIG. 11 is a flow chart showing an example of a NEXT setting process shown in FIG. 8.
Figure 12:
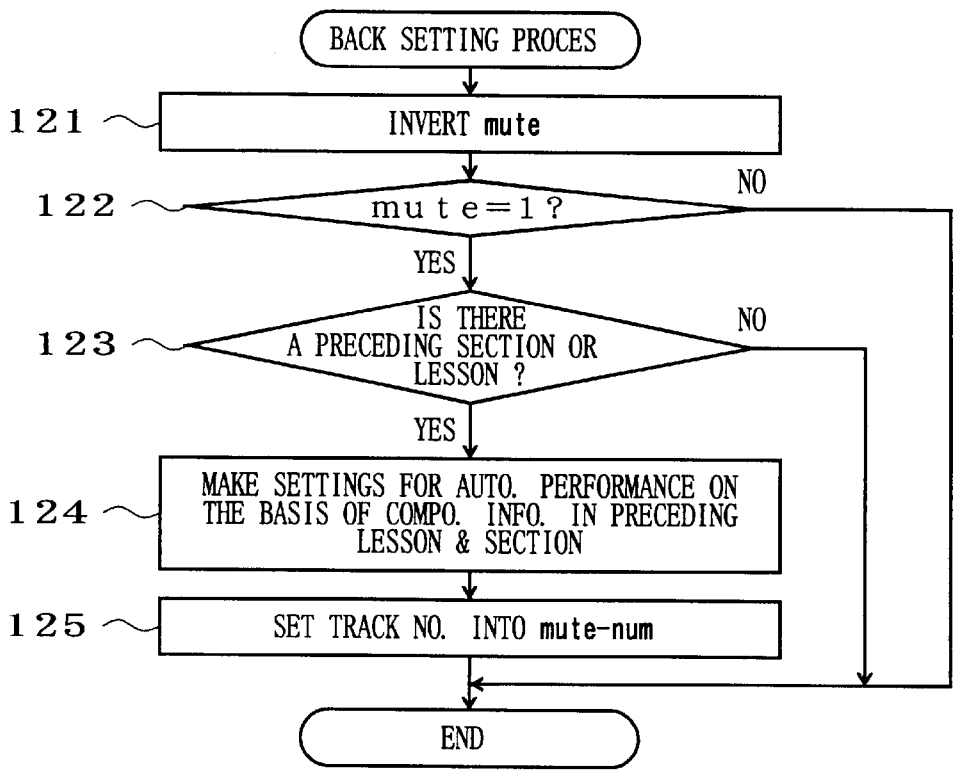
FIG. 12 is a flow chart showing an example of a BACK setting process shown in FIG. 8.

FIG. 8 is a flow chart showing an example of a main routine carried out in the musical performance practicing device. This main routine employs a mute number flag mute-num and a mute flag ("mute") as described below. of a performance track, in one of the composition information being currently read out, where tone-deadening or muting is to be effected, and such a mute track number is identified by reference to the lesson number of the currently read-out composition information. For composition information 1 to composition information 8 in lesson 1 and lesson 2, for example, only the melody track can become a mute track because each of these composition information describes a training music piece for melody performance. For composition information 9 in lesson 3, only the accompaniment track can become a mute track because this composition information describes a training music piece for accompaniment performance. Further, for composition information 10 in lesson 4 to composition information 11 in lesson 5, both the melody track and the accompaniment track (or either of the two tracks) can become a mute track because each of these composition information describes a training music piece for both melody performance and accompaniment performance. During lesson 4 or lesson 5, tone volume in the melody performance may be caused to become smaller as the chord progression performance is muted in stead of both the melody and the chord progression being completely muted, or only a beginning portion of a melody phrase may be performed after both the melody performance and the chord progression performance are muted. Further, as an ordinary way of muting, it is possible to decrease tone volume to a certain degree or sound only part of notes, such as a leading or forefront note in a phrase or measure, rather than effecting complete muting.

The mute flag ("mute") is one indicating whether an automatic performance in the track currently designated by the mute number flag mute-num is to be muted or not; the mute flag at a value "0" indicates that the performance in the designated track is to not be muted while the mute flag at a value "1" indicates that the performance in the designated track is to be muted. Namely, the muting is effected when the trainee player has improved his or her performance skill to a certain degree; more specifically, performance tones of the training music piece are muted to cause the player to carry out performance operations without listening to (or being guided by) the automatic performance of the training music piece, in order to ascertain a level of player's performance skill so far acquired through the practice.

In the main routine of FIG. 8 carried out in the musical performance practicing device, a desired music genre is first selected at step 81 from among various music genres, such as enka (Japanese popular ballads), popular music and classical music, by the user operating the corresponding genre switch. The following paragraphs describe a case where one fixed target music piece is designated in response to selection of the desired music genre; in an alternative, however, a plurality of target music pieces belonging to the selected music genre may be visually shown on the display screen so that the user can select a desired one of the target music pieces on the display screen. Let's assume here that the popular music is selected as the music genre and the "Green Green Grass of Home" is designated as the target music piece.

Once the music genre selection is thus made, lesson information, as shown in FIG. 1B, corresponding to the target music information designated in accordance with selection of the music genre is read out to be then stored into a predetermined area of the working memory. Then, a predetermined initialization process is carried out at next step S82, where the mute flag is first set to a low-level value "0" and then various settings for an automatic performance process are made on the basis of composition information that is specified in the first section of the first lesson provided by the lesson information. In the illustrated example, various settings that correspond to composition information 1 (FIG. 3A) specified in section 1 of lesson 1 are made with regard to the lesson information of FIG. 1B. Then, a mute track number for the current lesson is set into the mute track number flag mute-num. In the case of composition information 1 in the lesson information of FIG. 1B, the melody track number (track 1) is set into the mute track number flag mute-num. Because a particular performance part in which the user should practice is predetermined for each of the lessons, a mute track can be automatically determined from the lesson number; alternatively, a desired mute track may be set manually.

After completion of the above-mentioned initialization process, the main routine in the the musical performance practicing device executes operations of steps 83 to 8C in a looped fashion. At step 83, it is ascertained whether or not the switches for selecting a lesson number and/or section number have been operated or actuated, i.e., whether or not a desired lesson number and/or a section number has been selected by the user. If an affirmative (YES) answer is given st step 83, i.e., when the user has selected a lesson number and/or section number, the main routine moves on to step 84 to execute a reading and setting process. In this reading and setting process, various settings for an automatic performance are made on the basis of the composition information specified in the selected section of the selected lesson. Then, in the reading and setting process, the mute flag ("mute") is set to a low-level value "0", and a mute track number for the current lesson, identified from the selected lesson number, is stored into the mute number flag mute-num.

At next step 85, a determination is made as to whether the NEXT switch has been operated, i.e., whether or not an instruction has been given to advance the practice to another lesson or section following the currently-selected lesson or section. With an affirmative determination at step 85, the main routine goes to step 86 in order to execute a NEXT setting process. In the NEXT setting process, as flowcharted in detail in FIG. 11, the value of the mute flag ("mute") is inverted at step 111 and it is ascertained at next step 112 whether or not the inverted value of the mute flag ("mute") is the low-level value "0". According to the present embodiment, the practice based on each of the composition information can be carried out in two modes: a first mode where an automatic performance corresponding to all the tracks in the composition information is executed so that the player is allowed to practice while listening to or being guided by the automatically-performed tones; and a second mode where an automatic performance of a given training track is muted so that the player is allowed to practice performance without being guided for the muted track. These two modes are employed alternately as the practice progresses, and the mute flag ("mute") indicates which of the two modes is to be employed; in this embodiment, the content of the mute flag ("mute") is inverted each time the NEXT or BACK switch is actuated. Namely, if a YES determination is made at step 112 (i.e., if the inverted mute flag ("mute") is at the low-level value "0" as determined at step 112), it means that the mute flag was at the high-level value "1" prior to the actuation of the NEXT switch and the trainee player was doing the practice with an automatic performance of the training track muted or silenced (i.e., without being guided by the automatic performance of the track) and hence means that an instruction has been given to the practicing device to shift the practice to a next lesson or section. Thus, at following step 113, a determination is made as to whether or not such a next lesson or section is present.

If, on the other hand, a NO determination is made at step 112 (i.e., if the inverted mute flag ("mute") is at the high-level value "1" as determined at step 112), it means that the mute flag was at the low-level value "0" prior to the actuation of the NEXT switch and the trainee player was doing the practice without an automatic performance of the training track being muted (i.e., while being guided by automatic performance of the training track), so that the NEXT setting process is terminated in response to this negative determination. Namely, it means that the musical performance practicing device has been instructed to shift to the second mode where the automatic performance of the track designated by the mute number flag mute-num is muted so that the player is allowed to practice performance for the muted track independently.

If no next lesson or section is present as determined at step 113, the NEXT setting process is terminated without executing any further operation. Otherwise, i.e., if there exists the next lesson or section as determined at step 113, the process moves on to step 114 in order to make settings for an automatic performance on the basis of composition information specified in the next lesson or section. Then, at step 115 following step 114, a track number corresponding to the lesson is set into the mute number flag mute-num.

Referring back to FIG. 8, a further determination is made at step 87 as to whether the BACK switch has been operated, i.e., whether or not an instruction has been given to shift the practice back to another lesson or section preceding the currently-selected lesson or section. With an affirmative determination at step 87, the main routine goes to step 88 in order to execute a BACK setting process. In the BACK setting process, as flowcharted in detail in FIG. 12, the value of the mute flag ("mute") is inverted at step 121 and it is ascertained at step 122 whether or not the inverted value of the mute flag ("mute") is the high-level value "1". If a YES determination is made at step 122 (i.e., if the mute flag ("mute") is at the high-level value "1" as determined at step 122), it means that the mute flag was at the low-level value "0" prior to the actuation of the BACK switch and the trainee player was doing the practice without the automatic performance of the training track being muted, so that the process goes to step 123 in order to determine whether or not such a preceding lesson or section is present.

If, on the other hand, a NO determination is made at step 122 (i.e., if the mute flag ("mute") is at the low-level value "0" as determined at step 122), it means that the mute flag was at the high-level value "1" prior to the actuation of the BACK switch and the trainee player was doing the practice with the the automatic performance of the training track muted, so that the BACK setting process is terminated in response to this negative determination. Namely, it means that the practicing device has been instructed to shift from the second mode to the first mode where the automatic performance of the t raining track designated by the mute number track is not muted so that the player is now allowed to practice performance while listening to or being guided by automatically-performed tones of the track that has been muted up to the BACK switch actuation.

If no preceding lesson or section is present as determined at step 123, the BACK setting process is terminated without executing any further operation, because it means that the current section is the first or forefront section in the first lesson. Otherwise, i.e., if there exists the preceding lesson or section as determined at step 123, the process moves on to step 124 in order to make settings for an automatic performance on the basis of composition information specified in the preceding lesson or section. Then, at step 125 following step 124, a track number corresponding to the lesson is set into the mute number flag mute-num.

To move the practice forward or backward sequentially in the order the lessons are set in the lesson information, it is only necessary to operate the NEXT or BACK switch as mentioned above. Thus, after having practiced a training music piece of a particular lesson a desired number of times, the user can move on to the next lesson or move back to the preceding lesson by just operating the NEXT or BACK switch. Generally, at the initial stage of a particular lesson, the automatic performance of all the tracks is reproduced, so that the player can practice a selected training music piece while listening to (aurally checking) or being guided by automatically-performed tones of all the tracks. Then, once the player actuates the NEXT switch, the automatic performance is carried out with a selected mute track (i.e., training track) muted, so that the player can practice the training music piece without listening to or being guided by automatically-performed tones of the mute track. In the event that the BACK switch is actuated, operations opposite to the above-mentioned take place.

At step 89 of FIG. 8, it is further determined whether or not the performance start switch has been operated. If so, the main routine moves on to step 8A in order to execute the automatic performance process, but if not, the main routine jumps to step 8B. In the automatic performance process, as flowcharted in detail in FIG. 13, a determination is first made as to whether the mute flag ("mute") is currently at the low-level value "0". If the mute flag ("mute") is currently at the low-level value "0", an automatic performance is initiated which is based on information of all the tracks in currently-selected composition information. If, on the other hand, the mute flag ("mute") is currently at the high-level value "1", automatic performance based on the currently-selected composition information is initiated with only the automatic performance of the track, designated by the mute number flag mute-num, muted. Here, simultaneously with tone generation by the automatic performance, the keyboard guide function is also executed by sequentially illuminating the guide lamps, provided near the keyboard, to indicate tones to be generated on the basis of the composition information. The keyboard guide function may be executed in any other suitable way, such as by illuminating the keyboard keys themselves or by visually showing on the display screen the keys to be depressed or fingering. Further, in the described embodiment, the keyboard guide function using the guide lamps is constantly executed for melody and chord performance during an automatic performance of a music piece, and thus the player can practice performance of the mute track in accordance with the illuminated guide lamps.

At step 8B following the automatic performance process of step 89, other necessary operations than the above-mentioned are executed. Then, at step 8C, it is determined whether a switch for terminating the performance practice has been actuated or not. If answered in the affirmative, the routine is terminated, but if not, the routine loops back to step 83 in order to repeat the above-described performance practice processing.

Figure 14:
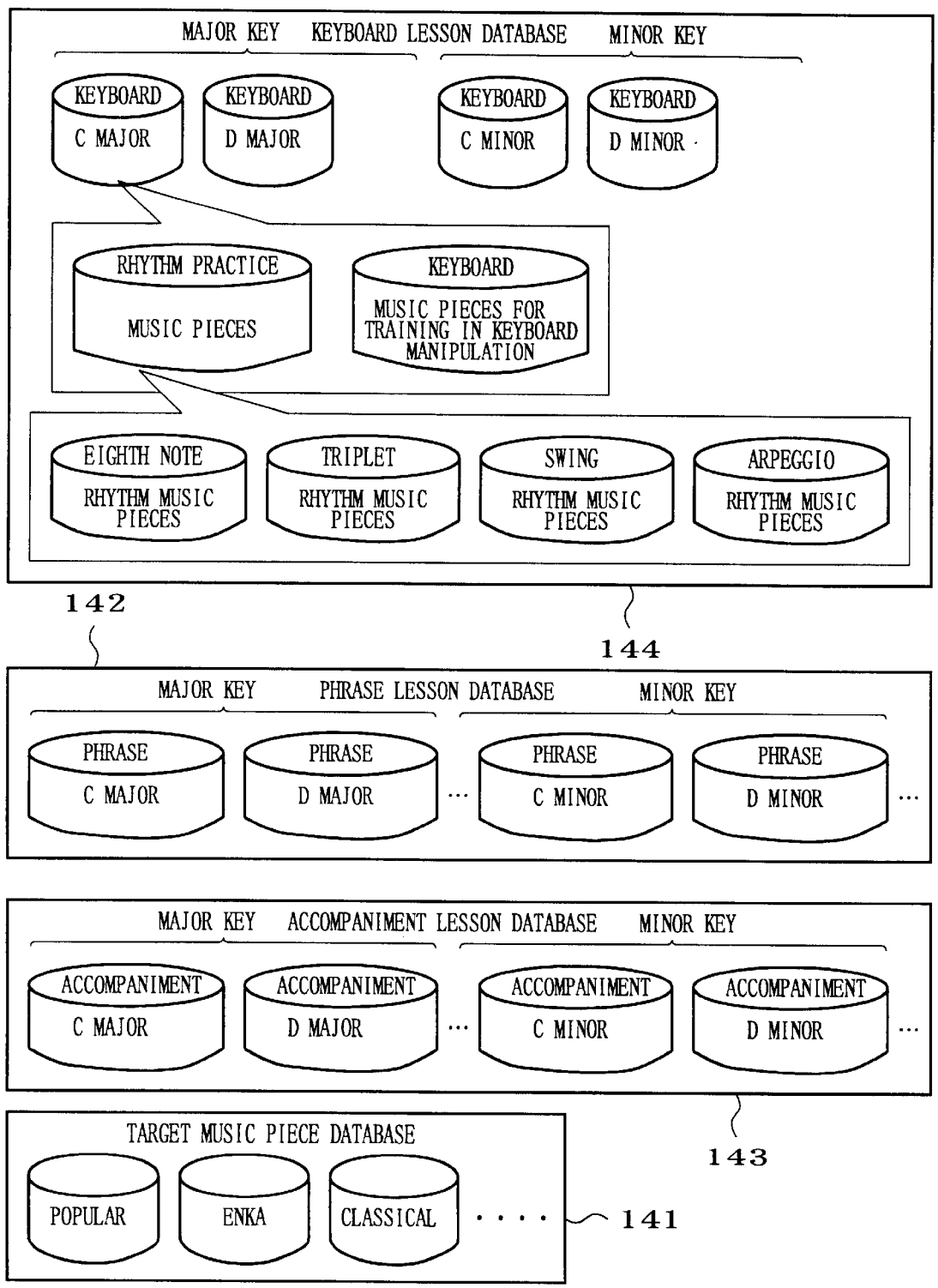
FIG. 14 is a diagram showing exemplary databases employed in a second embodiment of the present invention.

According to the embodiment as described above, a target music piece and lesson information, as shown in FIG. 1B, corresponding to the target music piece are designated in response to selection of a desired music genre, in response to which the player is allowed to do a series of performance lessons. In an alternative, however, a database for target music piece 141, database for phrase lesson 142, database for accompaniment lesson 143 and database for keyboard lesson 144 may be provided in a second embodiment of the invention as shown in FIG. 14 so that the lesson information is prepared by selecting predetermined items of composition information from among these databases and combining together the selected items of composition information as desired by the user.

Because it is generally difficult for the user to select desired composition information itself from among the databases 142 to 144, the second embodiment is arranged to only cause the user to select a desired target music piece, extract training music pieces (i.e., composition information), necessary for acquiring a skill to perform the selected target music piece, from among the databases 142 to 144, and thereby construct lesson information as shown in FIG. 1B. It will be appreciated that the lesson information may be constructed of items of composition information, corresponding to the training music pieces, that are searched for, through software operations by a computer, on the basis of the genre, key, rhythm, beat, etc. of the desired target music piece, or may be constructed of items of composition information selected optionally by the user from among the searched-for items. Specific examples of conditions to be applied to the search may correspond to or may be determined on the basis of the particular relation between the score shown in FIG. 7 and the score shown in one of FIGS. 3 to 6, such as sameness or similarity in the performance technique like overcross-fingering. The software-based search may be easily carried out using the known data analysis technique.

The information descriptive of target music pieces in the database 141 is classified into the musical genre; i.e., compositions of various musical genres, such as enka (Japanese popular ballads), popular music and classical music, and is registered in the database 141. For example, composition information 11 employed in the above-mentioned first embodiment is registered in a popular music database section of this database 141.

In the database 142, there are registered, for each of the keys, a plurality of items of composition information intended for the phrase lesson. The items of composition information registered in the database 142 each correspond to one or more phrases of well known music pieces. For example, composition information 9 and composition information 10 employed in the above-mentioned first embodiment is registered in different database sections of this database 143 which correspond to their keys.

The keyboard lesson database 144 is also divided into a plurality of database sections corresponding to the different keys. The database sections for each individual key each contain items of information descriptive of music pieces for rhythm training and items of information descriptive of music pieces for keyboard-manipulation training. For example, composition information 1 to composition information 3 employed in the above-mentioned first embodiment is registered in the database section for keyboard-manipulation training.

Figure 15:
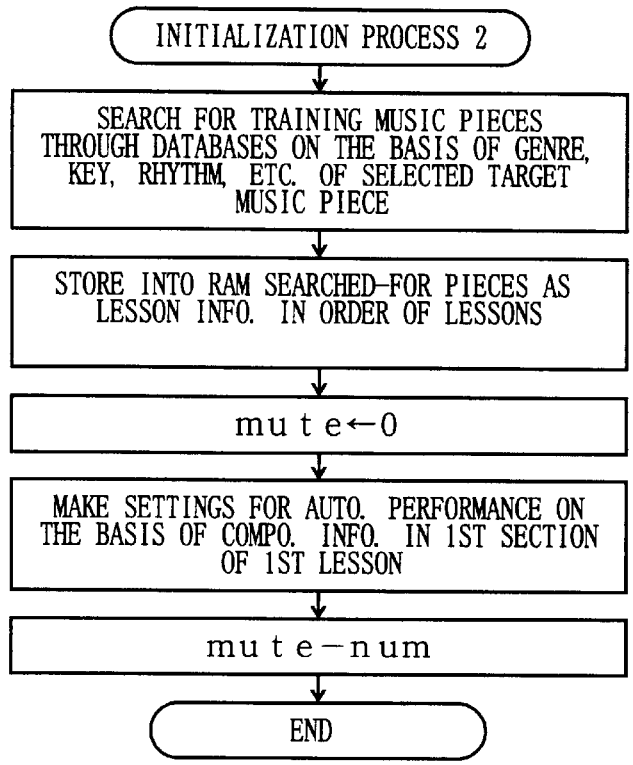
FIG. 15 is a flow chart showing another example of the initialization process shown in FIG. 8.

The items of information descriptive of music pieces for rhythm training are divided into a plurality of database sections corresponding to different types of rhythm training, such as training focused on eighth notes, training focused on triplets, training for swing performance and training for arpeggio performance. For example, composition information 4 employed in the above-mentioned first embodiment is registered in the database section corresponding to the training focused on eighth notes.

Where a predetermined target music piece is selected using the above-mentioned database, the initialization process of FIG. 8 is carried out in a manner as flowcharted in FIG. 15. Namely, in this initialization process, prior to a series of the operations as shown in FIG. 4, appropriate items of composition information are searched for through the individual databases of FIG. 14 with reference to the genre, key, rhythm, etc. of the selected target music piece, and the searched-for items of composition information are then stored into the RAM as lesson information in a desired order of lessons. In this manner, the lesson information is constructed as shown in FIG. 1B, and then the same series of initialization operations as that of FIG. 4 is carried out using the thus-constructed lesson information.

In an alternative, the above-mentioned phrase lesson database may be omitted and the above-mentioned target music piece database may be used also as the above-mentioned phrase lesson database. Namely, because the target music piece database contains data of all the composition information, partial phrases of selected training music pieces corresponding to the designated target music piece can be extracted out of the target music piece database and used as composition information for the phrase lesson; as a consequence, the phrase lesson database can be omitted without involving significant inconveniences.

Further, same keyboard lesson composition information may be selected for target music pieces of a same key and then style data in the composition information may be modified to appropriately correspond to the respective genres. This arrangement would greatly reduce a quantity of data stored in the database.

Figure 16:
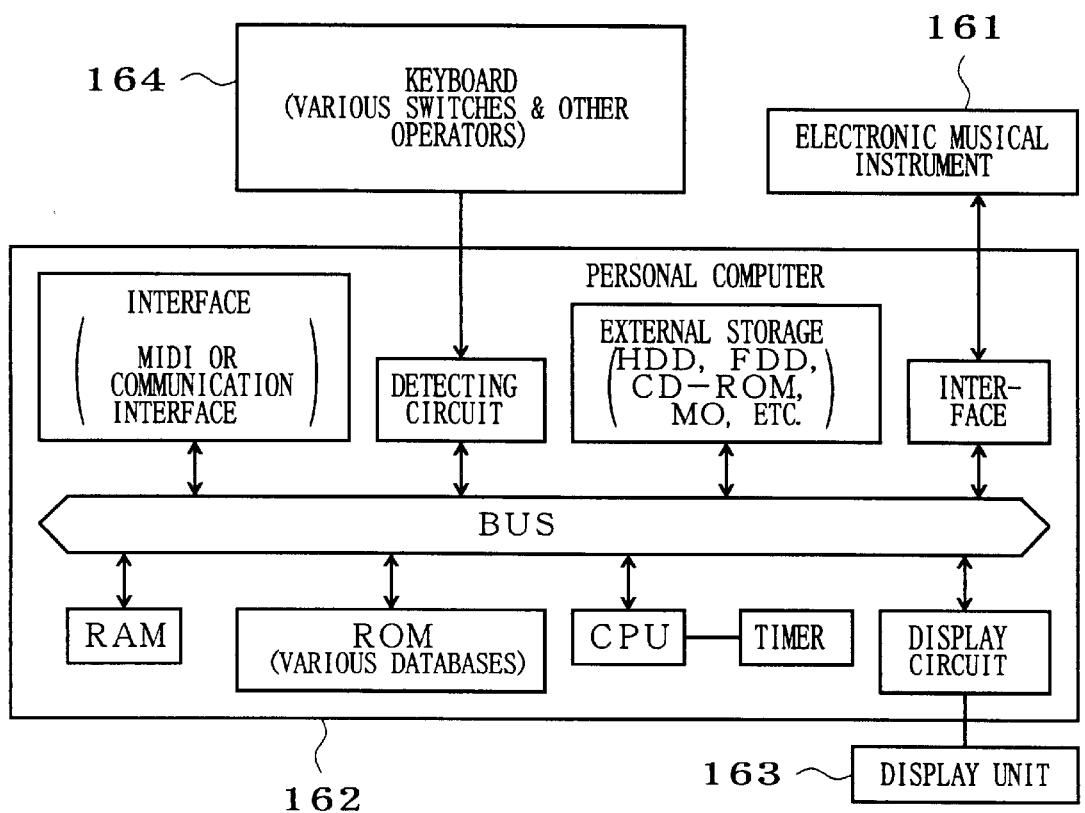
FIG. 16 is a block diagram showing an exemplary hardware setup of a musical performance practicing device in accordance with another embodiment of the present invention.

The preferred embodiments have been described above in relation to the electronic musical instrument containing the automatic performance device and the musical performance practicing device. Alternatively, as shown in FIG. 16, an electronic musical instrument 161 and a personal computer 162 may be interconnected so that the scores as shown in FIGS. 3 to 7 can be visually shown on a display of the computer 162 and a keyboard of the computer 162 can replace the operation panel shown in FIG. 2.

Furthermore, whereas the preferred embodiments have been described above in relation to the case where the number of tracks is two, the present invention is not so limited. Furthermore, whereas the preferred embodiments have been described above in relation to the case where two sets of the performance information and chord progression information are stored in different tracks, the performance information and chord progression information may be stored together in mixed form. Moreover, although the preferred embodiments have been described above in relation to the case where the chord progression information is included in the composition information, the chord progression information may be separated from the composition information.

Furthermore, whereas the preferred embodiments have been described above as using previously-made lesson information, the lesson information may be edited as desired by the user. For example, part of one or more of the lessons employed in the embodiments may be omitted, or the number of training music pieces in any one of the lessons may be decreased or increased as desired. In addition, the lessons may be changed in their turns or may be modified freely. Further, a training in fingering on the keyboard may be added to the practicing menu.

Furthermore, whereas the preferred embodiments have been described above in relation to the case where the keyboard lesson uses composition information that is different from the information descriptive of the target music piece, a portion of the melody in the target music piece may be used as a training music piece while using an accompaniment style different from that of the target music piece. Similar modification may apply to the rhythm lesson.

Moreover, whereas the preferred embodiments have been described above in relation to the case where the accompaniment lesson is carried out in the single-fingered input mode, the accompaniment lesson may be in the normal finger input mode where a desired chord is entered by simultaneously depressing a plurality of keys corresponding to component notes of the desired chord. Further, sounds indicative of a performance tempo (tempo count sounds) may be generated during a lesson.

Furthermore, although the preferred embodiments have been described above in relation to the case where the mute track is predetermined depending on a content or type of lesson, the mute track may be set freely by the user; as previously noted, the term "mute" as used herein is intended to represent broad concepts, including not only complete silencing of all tones but also lowering an overall tone volume level of the tones or silencing only some of the tones.

What is more, an arrangement may be made to allow the automatic performance to be started at any desired point of a selected music piece. Further, the automatic performance may be caused to move forward only when a key depression by the player matches a key to be actually depressed.

The present invention may be implemented in any suitable form rather than by the above-mentioned combination of a personal computer and application software, in which case the application software may be prestored on a recording medium, such as a magnetic disk, optical disk and semiconductor memory, and supplied to the personal computer directly or via a communication network. Further, any other type of electronic musical instrument than the keyboard-type instrument, such as a stringed instrument, wind instrument or percussion instrument, may be employed in the present invention. Further, the present invention may be embodied as, rather than the electronic musical instrument containing the tone generator device and automatic accompaniment device as described, a discrete-type electronic musical instrument where a tone generator module and sequencer provided separately from each other are connected such as via MIDI and/or network communication means.

The performance data used in the present invention may be in any desired format such as: the "event plus relative time" format where an occurrence time of each performance event is expressed by an elapsed time from a preceding event; the "event plus absolute time" format where an occurrence time of each performance event is expressed by an absolute time within a music piece or measure; the "pitch (rest) plus note length" format where performance data is expressed by a combination of pitch and length of a note or by a combination of rest and its length; or the so-called "solid" format where a memory location is allocated for each minimum resolution unit of a performance and each performance event is stored at one of the memory locations corresponding to an occurrence time of the event.

Furthermore, the automatic performance tempo may be changed in any desired manner; for example, it may be changed by varying a tempo clock (interrupt signal) frequency, modifying a timing data value while maintaining a constant tempo clock frequency or varying a value used to count timing data per operation.

The automatic performance data may be in a format where data for a plurality of channels are stored together in a mixed condition or in a format where data for each channel is stored in a separate track.

In summary, the present invention achieves the benefits that a performance skill or proficiency acquired through practice in a target music piece can be effectively applied to performance of other music pieces than the target music piece and a trainee player can continue doing performance practice without getting tired of the practice.

What is claimed is:

1. A musical performance practicing device comprising:
   a designating section that designates a target music piece which a player aims to perform;
   a lesson information supplying section that supplies lesson information to be used for performance practice of the target music piece designated by said designating section, said lesson information being constructed by combining information descriptive of a plurality of training music pieces bearing particular relations to the target music piece; and
   a control section that controls the performance practice on the basis of the lesson information supplied by said lesson information supplying section;
   wherein each training music piece has a characteristic in common with the target music piece, and
   wherein each training music piece is not a version of the target music piece.

2. A musical performance practicing device as recited in claim 1 wherein the training music pieces included in the lesson information are classified into a plurality of groups according to levels of performance skill necessary for performance of the training music pieces.

3. A musical performance practicing device as recited in claim 1 wherein each of the training music pieces included in the lesson information comprises accompaniment information and melody information and at least a performance based on one of the accompaniment information and melody information can be muted depending on a desired content of training.

4. A musical performance practicing device as recited in claim 1 which further comprises a training music piece selecting section that designates one of the training music pieces for performance practice of the designated training music piece.

5. A musical performance practicing device as recited in claim 1 wherein said lesson information supplying section prepares the lesson information by extracting training music pieces from among a composition information database on the basis of the target music piece designated by said designating section.

6. A musical practice performing device as claimed in claim 1, further comprising a memory for storing the training music pieces.

7. A musical practice performing device as claimed in claim 1, wherein the characteristic is at least one of genre, timing, chord progression and fingering.

8. A musical performance practicing method comprising the steps of:
   designating a target music piece which a player aims to perform with a designating section device;
   supplying lesson information to be used for performance practice of the target music piece designated by said step of designating, said lesson information being constructed by combining information descriptive of a plurality of training music pieces bearing particular relations to the target music piece; and
   controlling the performance practice on the basis of the lesson information supplied by said step of supplying with a control section device;
   wherein each training music piece has a characteristic in common with the target music piece; and
   wherein each training music piece is not a version of the target music piece.

9. A musical performance practicing method as recited in claim 8 wherein each of the training music pieces included in the lesson information comprises accompaniment information and melody information and at least a performance based on one of the accompaniment information and melody information can be muted depending on a desired content of practice.

10. A musical performance practicing method characterized by, in response to designation of a target music piece which a player aims to perform, executing the steps of:

causing the player to practice performance operation relating to the target music piece while automatically performing a training music piece that bears a particular relation to performance operation necessary for performance of the target music piece;

causing the player to practice a rhythm performance relating to rhythm of the target music piece while automatically performing a training music piece that bears a particular relation to the rhythm of the target music piece;

causing the player to practice at least one of the performance operation and rhythm performance of the target music piece while automatically performing a partial phrase of a training music piece other than the target music piece that bears a particular relation to the target music piece; and causing the player to practice performance of the target music piece itself;

wherein each training music piece is not a version of the target music piece.

11. A musical performance practicing method as recited in claim 10 wherein each of the training music pieces comprises melody information and accompaniment information and each of said steps is capable of causing the player to practice performance based on at least one of the melody information and accompaniment information.

12. A machine-readable recording medium containing a group of instructions of a program to be executed by a computer for controlling musical performance practice, said program for controlling musical performance practice comprising the steps of:

designating a target music piece which a player aims to perform;

supplying lesson information to be used intended for performance practice of the target music piece designated by said step of designating, said lesson information being constructed by combining information descriptive of a plurality of training music pieces bearing particular relations to the target music piece; and controlling the performance practice on the basis of the lesson information supplied by said step of supplying;

wherein each training music piece has a characteristic in common with the target music piece; and wherein each training music piece is not a version of the target music piece.

13. A recording medium containing lesson information stored as machine executable data wherein to allow a player to acquire a skill for performing a target music piece, said lesson information is constructed by combining information descriptive of a plurality of training music pieces bearing relations to the target music piece, such that each training music piece has a characteristic in common with the target music piece, and wherein the training music pieces included in the lesson information are other than the target music piece, such that each training music piece is not a version of the target music piece but at least appear to be useful for the player in acquiring a skill necessary for performing the target music piece.

14. A recording medium as recited in claim 13 wherein each of the training music pieces included in the lesson information comprises accompaniment information and melody information and at least a performance based on one of the accompaniment information and melody information can be muted depending on a desired content of practice.

15. A recording medium as recited in claim 13 wherein said lesson information is constructed by selecting information descriptive of training music pieces from among a composition information database on the basis of the target music piece.

16. A recording medium containing lesson information wherein said lesson information includes:

information descriptive of one or more target music pieces, which is recorded on the recording medium as machine executable data;

information descriptive of a training music piece, recorded on the recording medium as machine executable data, that corresponds to any one of the target music pieces and bears a particular relation to performance operation for the corresponding target music piece;

information descriptive of a training music piece, recorded on the recording medium as machine executable data, that corresponds to any one of the target music pieces and bears a particular relation to a rhythm of the corresponding target music piece; and information descriptive of a partial phrase of a training music piece, recorded on the recording medium as machine executable data, that corresponds to any one of the target music pieces and bears a particular relation to performance operation for the corresponding target music piece;

wherein each training music piece has a characteristic in common with the target music piece; and wherein each training music piece is not a version of the target music piece.

17. A recording medium as recited in claim 16 wherein said lesson information is constructed by selecting information descriptive of training music pieces from among a composition information database on the basis of the one or more target music pieces.

* * * * *